May 3, 1938.    F. B. LOMAX    2,115,729
PROCESS OF FILTERING EGGS
Original Filed Feb. 7, 1935
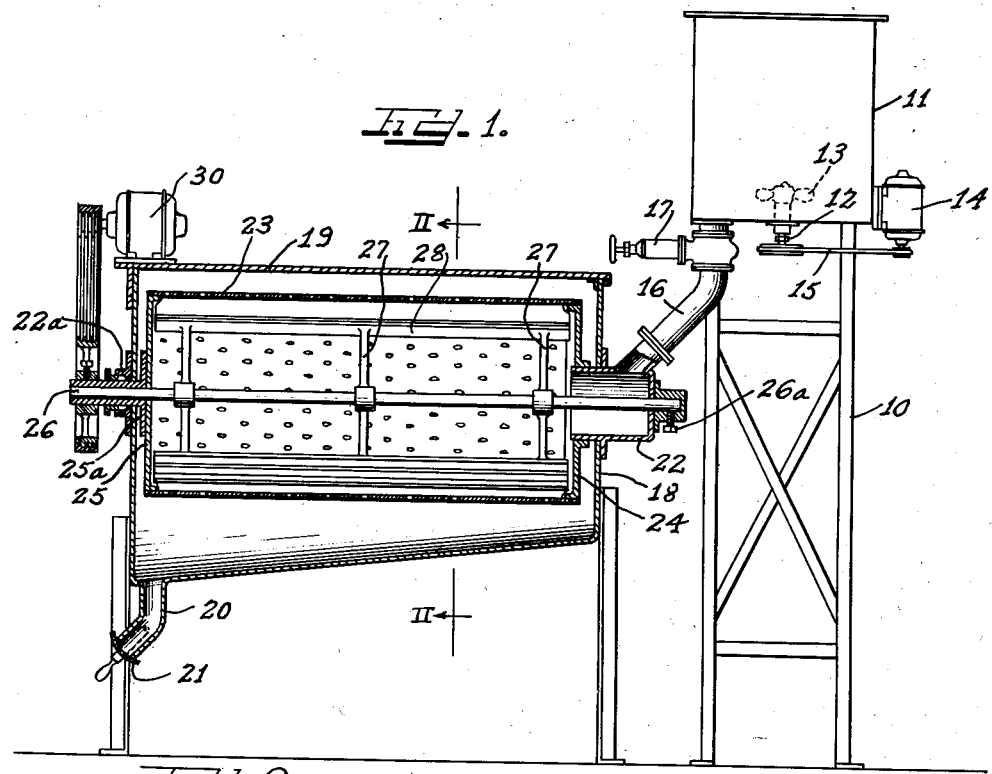
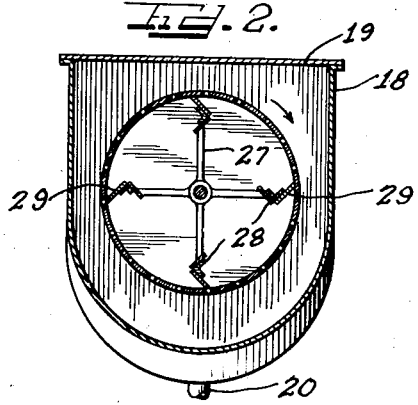
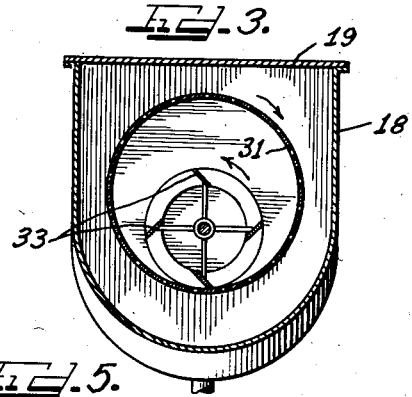
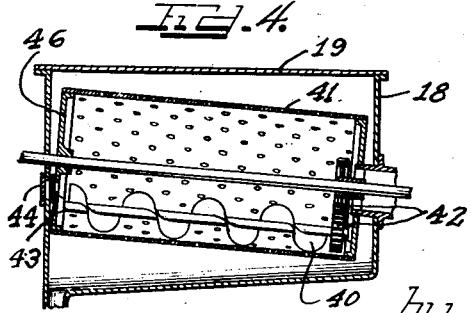
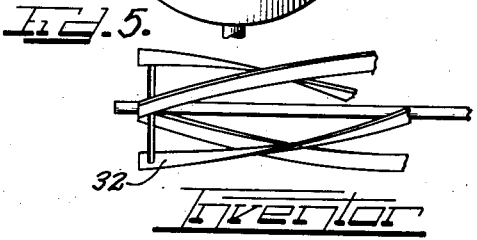
Inventor
Frank B. Lomax.
by Charles W. Hills Attys.

Patented May 3, 1938

2,115,729

UNITED STATES PATENT OFFICE 2,115,729

PROCESS OF FILTERING EGGS

Frank B. Lomax, Chicago, Ill.

Original application February 7, 1935, Serial No. 5,329. Divided and this application May 7, 1936, Serial No. 78,338

4 Claims. (Cl. 99—113)

This invention relates to the cleansing of eggs from shell fragments and other foreign substances. More particularly this invention relates to the process of filtering egg material through a foraminous barrier capable of retaining shell fragments, unbroken chalaza, lumps and other foreign materials thereon.

This application is a division of my copending application Serial No. 5,329, filed February 7, 1935, entitled "Apparatus for filtering eggs", now Patent No. 2,089,215, issued August 10, 1937.

In the present invention fresh eggs are broken to separate the egg meats from the shells. The process is operative on the whites portions of the eggs only, on the yolk portions of the eggs only or on both the egg yolks and whites. The egg meats may be thoroughly mixed before filtering according to this process to assure a mass of uniform color or texture. After treatment, according to this invention, the eggs can be stored for future use by freezing the same to a solid form.

It has been the aim of egg canners to produce broken eggs free from foreign materials such as egg shells, dirt, hard fibrous parts of the yolk sac, or other lumpy matter and to mix the egg meats thoroughly to produce a uniform color or texture free from streaks. The egg canners have furthermore repeatedly endeavored without complete success to prevent air from being incorporated into the egg meats with the attendant production of a foamy mass.

In the process of the present invention pumps are entirely dispensed with and gravity is relied upon to transfer the egg meats from a mixing tank, in which they are collected, to a filter. During the gravitational flow, the eggs are filtered to remove shell fragments and to otherwise rid them of lumpy material.

The filter used in the present process consists of a wire mesh screen or a perforated metal member of a porosity adapted to remove particles of shells or other undesirable matter. The filter is equipped to disintegrate or remove chalaza and matter that is not drained or squeezed through the filter will remain on the filter bed.

According to the present invention eggs are broken in the usual manner and either the whole eggs, the yolks, or the whites are treated by placing the same in a mixing tank where any ingredients such as salt, sugar, and the like may be added. The eggs are thoroughly mixed in the tank by means of an agitator operating on the egg material from below the surface thereof so as to prevent the incorporation of air into the material. When a mixture of uniform color and texture has been obtained the resulting mass is flowed by gravity to an egg filter enclosed in a chamber. In the egg filter the egg meats are gently pressed through the screen or perforated plate member while at the same time the inner face of this member is scraped clean.

The present process is readily adapted for a continuous operation since the filter apparatus is continually cleaned during the filtering operation.

It is then an object of this invention to provide a continuous process for filtering eggs.

A further object of this invention is to provide a process of filtering eggs wherein the unfilterable ingredients are allowed to build upon a filtered member and are then intermittently displaced from said member to prevent a clogging of the member.

A further object of this invention is to provide a continuous process of filtering eggs free from shell fragments, lumps, dirt and the like and to simultaneously disintegrate the egg chalaza to a size suitable for use.

A further object of this invention is to provide a process for filtering eggs wherein egg meats are beaten through a filter medium without having air incorporated into the mass.

Another object of this invention is to provide a continuous process of filtering eggs wherein broken egg material containing egg meats, dirt, lumps, chalaza, shell fragments and the like is uniformly mixed without the incorporation of air therein to produce a homogeneous mass and filtering said mass as it builds up on a filter medium while intermittently disturbing the built up unfiltered mass to press the egg meats therethrough and disintegrate the chalaza.

Other and further objects of this invention will become apparent from the following detailed description of the annexed sheet of drawings which illustrates types of apparatus for carrying out the process.

On the drawing:

Figure 1 is a vertical cross-sectional view, partly in elevation, of one type of apparatus for carrying out the process of this invention.

Figure 2 is a transverse cross-sectional view taken substantially along the line II—II of Figure 1.

Figure 3 is a transverse cross-sectional view of a modified form of filter apparatus which can be used for carrying out the process of this invention.

Figure 4 is a diagrammatical cross-sectional view of another modified form of apparatus useful in carrying out the process of this invention.

Figure 5 is a fragmentary elevational view of a scraper that can be used in the illustrated apparatus with either a stationary or rotary filter.

As shown on the drawing:

In Figure 1 the reference numeral 10 indicates a support for an open topped tank 11. The tank 11 has a central bottom aperture in which a shaft 12 having a mixing propeller 13 secured thereto is journaled. The shaft 12 externally of the tank 11 is provided with a pulley driven by a motor 14, secured on the side of the tank, through a belt 15.

A drain aperture is provided in the bottom of the tank 11 to permit drainage of the contents of the tank into a drain conduit 16 controlled by a valve 17. The conduit 16 discharges into the interior or central part of a filter housing 18 which has a semi-cylindrical sloping bottom, vertical side walls and a removable cover 19. The lowermost part of the sloping bottom of the housing is provided with a discharge conduit 20 controlled by a valve 21.

The filter housing 18 is supported on legs or standards and has, at its receiving end, a projecting head 22 into which the conduit 16 from the receiving tank empties.

In the form of apparatus illustrated in Figures 1 and 2 the filter housing contains a filter member 23 in the form of an apertured cylinder having solid end walls 24 and 25 and perforated side walls adapted to prevent the passage of foreign materials, unbroken chalaza, egg shells, lumps and the like therethrough while permitting the passage of the egg meats therethrough into the housing 18.

The solid end plate 24 has a central aperture telescoping over the open end of the head 22 of the housing 18 and is journaled for rotation on the head 22. The plate 25 is rotatable upon a shaft 26 locked within the housing 18 by a lock screw 26a. The shaft 26 supports at spaced intervals, spiders 27 which carry longitudinal scraping members 28.

As best shown in Figure 2 the scrapers 28 have a toe 29 closely contacting the inner wall of the filter 23 to scrape material therefrom and cut off those portions of material which have partly passed through the filter to separate such portions from the part which remains within the filter. The shape of the toe is such that it tends to force material through the apertures in the filter 23.

The plate 25 is secured to a flanged sleeve 25a riding on the shaft 26 and journaled in a packing box 22a about which a pulley is provided driven by a motor 30 which can be conveniently mounted on the cover 19 of the housing.

The apparatus illustrated in Figures 1 and 2 carries out the process of this invention as follows: Unfiltered egg meats are first deposited in the receiving tank 11. The mixing propeller 13 is then put in motion to uniformly mix this material and the uniformly mixed mass is drained by gravity from the tank 11 into the filter 23 by opening the valve 17. The motor 30 is then energized to rotate the filter relative to the stationarily mounted scrapers 28. As the filter 23 rotates the scrapers operate directly upon the egg material to press the same against the foraminous surfaces of the filter and to cut off or force through the filter such material as tends to protrude into the apertures thereof. This effects a disintegration of chalaza material to a size suitable for use. The obtuse angular relation between the front faces of the toes 29 and the inner periphery of the filter 23 effects a gentle squeezing of the egg meats through the pores of the filter simultaneously with the cutting operations.

The filtered material passed through the filter collects in the bottom of the housing 18 and is drained for storage through the conduit 20.

In the form of apparatus illustrated in Figure 3 the housing 18 is similar to the housing described in Figures 1 and 2 and is closed by means of the cover 19. The cylinder or filter member 31 therein is mounted for rotation in one direction while the scrapers 33 are suitably journaled and rotated in the opposite direction as indicated. In this manner the scrapers 33 contact a limited and ever-changing arc in the periphery of the filter. If desired the scraper blades may be rotated and the cylinder may be stationary.

As shown in Figure 5 the scraper blades 32 are for use in a filtering cylinder of either the stationary or rotary type. The blades 32 are arranged in helical arcs and can be rotated in an opposite direction to the direction of rotation of the filter cylinder as illustrated in Figure 3 or can be rotated in a stationary filter cylinder. If desired the blades 32 can be of the same diameter as the interior of the cylinder such as the scrapers 28 and can be held stationary in a rotating cylinder.

In Figure 4 the filter housing 18 is closed with the cover 19 and receives a cylinder filter member 41 therein disposed at an angle to the housing. A ribbon conveyor or worm 40 is provided within the cylinder filter 41 and is rotated through gears 42 for gathering the residue within the cylinder 41 at one end thereof from which it can be removed through the apertures 43 and 44, provided in the casing or housing 18 and in an end supporting member 46 of the filter 41.

From the above description it should be understood that the illustrated forms of apparatus are intended merely as examples of devices for carrying out the process of the invention and that the invention is not limited to use in the particularly described apparatus.

I am aware that numerous details of the process may be varied through a wide range without departing from the principles of this invention, and I, therefore, do not purpose limiting the patent granted hereon otherwise than necessitated by the prior art.

I claim as my invention:

1. The process of filtering eggs by gravity which comprises draining a mass of broken egg material containing egg meats, chalaza, shell fragments, lumps and the like into a member having a foraminous wall adapted to withhold shell fragments, lumps and unbroken chalaza thereon while permitting the passage of egg meats therethrough, allowing layers of the egg material to build up on said wall and form a filter bed and intermittently scraping off said layers while simultaneously pressing the egg meats through the foramina of the wall.

2. A continuous process of filtering eggs by gravity which comprises draining broken egg material containing egg meats, chalaza, shell fragments and the like into a cylindrical filter, allowing the egg meats to drain through the filter while retaining chalaza, shell fragments, and the like within the filter to build up a filter bed thereon, simultaneously scraping layers of egg material from the filter to cut off portions of the egg material partially passed through filter to permit their complete passage and collecting the filtered egg meats for storage.

3. The process of filtering eggs by gravity which comprises depositing broken egg material against a foraminous cylindrical surface, rotating the surface to allow egg meats to drain through the foramina and simultaneously scraping portions of deposited egg material from the foraminous surface for cleaning said surface while cutting portions of egg material passed partly through the foramina to permit complete passage of the portions.

4. The process of filtering eggs by gravity which comprises collecting a batch of unfiltered egg meats, stirring the batch from below the surface thereof to produce a mass of uniform character, draining a portion of the mass into a reticular drum adapted to retain shell fragments, lumps and unbroken chalaza therein while permitting the passage of egg meats therethrough, rotating the drum, allowing a layer of the egg material to build up on the inner surface of the drum and intermittently raising said layer away from said surface to cut off portions of the egg material partially passed through the drum to permit their complete passage.

FRANK B. LOMAX.